United States Patent [19]
Kawasaki et al.

[11] Patent Number: 6,025,084
[45] Date of Patent: Feb. 15, 2000

[54] ELECTROCHEMICAL CELL HAVING GAS FLOW CHANNELS SURROUNDED BY SOLID ELECTROLYTE AND INTERCONNECTER

[75] Inventors: Shinji Kawasaki, Nagoya; Kiyoshi Okumura, Kasugai, both of Japan

[73] Assignee: NGK Insulators, Ltd., Japan

[21] Appl. No.: 08/861,010

[22] Filed: May 21, 1997

[30] Foreign Application Priority Data

| May 23, 1996 | [JP] | Japan | .................................... 8-128246 |
| Apr. 14, 1997 | [JP] | Japan | .................................... 9-095539 |

[51] Int. Cl.$^7$ .................................................. H01M 8/10
[52] U.S. Cl. ............................................. 429/30; 429/34
[58] Field of Search ........................................ 429/30, 34

[56] References Cited

U.S. PATENT DOCUMENTS

| 4,476,198 | 10/1984 | Ackerman et al. | 429/32 |
| 4,666,798 | 5/1987 | Herceg | 429/12 |
| 4,877,506 | 10/1989 | Fee et al. | 204/242 |
| 4,883,497 | 11/1989 | Claar et al. | 29/623.5 |
| 5,273,837 | 12/1993 | Aitken et al. | 429/30 |

Primary Examiner—Maria Nuzzolillo
Assistant Examiner—J. O'Malley
Attorney, Agent, or Firm—Parkhurst & Wendel, L.L.P.

[57] ABSTRACT

An electrochemical cell including at least one dense solid electrolyte body, at least two dense interconnectors for collecting current flowing through the cell, cathodes and anodes, wherein the at least one dense solid electrolyte body and at least two dense interconnectors constitute a structural body, a plurality of first gas flow channels and a plurality of second gas flow channels both extend in a given direction, and are each defined and surrounded by a part of the at least one solid electrolyte body and a part of the at least two interconnectors, the anodes are formed on respective walls defined by a part of at least one solid electrolyte body and a part of at least two interconnectors and constituting the respective first gas flow channels, the cathodes are formed on respective walls defined by a part of at least one solid electrolyte body and a part of at least two interconnectors and constituting the respective second gas flow channels, every anode is opposed to an adjacent cathode or adjacent cathodes via a solid electrolyte body, and every cathode is opposed to an adjacent anode or adjacent anodes via a solid electrolyte body.

8 Claims, 11 Drawing Sheets

FIG_1

FIG. 2

FIG_3

FIG_4

FIG_5

FIG. 6

FIG_7

FIG_8

ELECTROCHEMICAL CELL HAVING GAS FLOW CHANNELS SURROUNDED BY SOLID ELECTROLYTE AND INTERCONNECTER

BACKGROUND OF THE INVENTION (1) Field of the Invention

The present invention relates to electrochemical cells such as solid oxide fuel cells (SOFCs), steam electrolysis cells, oxygen pumps, and NOx decomposition cells. The invention also relates to a producing process for the production of such electrochemical cells, and electrochemical devices using such electrochemical cells.

(2) Related Art Statement

The solid oxide fuel cells (SOFCs) are broadly classified into the so-called flat planar type and the so-called tubular type. Although it is said that the tubular type SOFC is most likely to be practically used, the flat planar type SOFC is more advantageous from the standpoint of the output density per unit volume. However, in the flat planar type SOFC, an electric power-generating stack is constructed by alternatively laminating so-called separators and electric power-generating layers, but the SOFC thus produced has a difficult problem in sealing.

On the other hand, so-called integrated (monolithic) type SOFCs different from the above type SOFCs are proposed. The above-mentioned tubular SOFC and the flat planar type SOFC are of a design in which separate unit cells are laminated successively one upon another. To the contrary, the monolithic type SOFC proposed by Argonne National Laboratory in the United States, is obtained by preliminarily preparing green sheets of respective components of the SOFC, forming a laminate through laminating the above green sheets of the components in a given shape, and sintering the entire laminate. The monolithic type SOFCs include a parallel flow type (co-flow type) and an orthogonal flow type (cross flow type). It is expected that the monolithic type SOFC can realize an extremely high output density of as high as around 8 kW/kg ("Fuel Cell Generation" published by CORONA PUBLISHING CO., LTD. in May 20, 1994).

Among them, the parallel flow type SOFC is constructed such that corrugated three layers of a fuel electrode, a solid electrolyte and an air electrode are integrated, and the thus integrated corrugated laminate is sandwiched by flat planar interconnectors. The orthogonal flow type SOFC is constructed such that the flat planar electrodes and electrolyte plate are laminated and sandwiched between corrugated interconnector. However, these fine constructions are so complicated that it is difficult to form a molded body by laminating respective green sheets of the air electrode, the fuel electrode, the solid electrolyte and the interconnector. In addition, since the air electrode, the fuel electrode, the solid electrolyte and the interconnector have completely different porosities, characteristics, and optimum sintering temperatures, it is extremely difficult to finish SOFC components having their respective favorable characteristics by simultaneous sintering. Consequently, although the monolithic type SOFC has been proposed before, it has been considered difficult to practically use such SOFC, presently such monolithic SOFC cells are still in a trial stage.

SUMMARY OF THE INVENTION

It is an object of the present invention to provide electrochemical cells having a large electrode area per unit volume and a high efficiency. It is another object of the present invention to provide a new electrochemical cell structure which is structurally relatively simple, does not need any special structurally sealing mechanism, and can be produced by simultaneous sintering. It is a further object to provide a process for producing such an electrochemical cell, and also to provide an electrochemical device using such an electrochemical cell or such electrochemical cells.

An electrochemical cell according to the present invention includes at least one dense solid electrolyte body, at least two dense interconnectors for collecting current flowing in the cell, cathodes and anodes, wherein at least one dense solid electrolyte body and at least two dense interconnectors constitute a structural body, a plurality of first gas flow channels and a plurality of second gas flow channels both extend through the structural body in a given direction, and are each defined and surrounded by a part of the at least one solid electrolyte body and a part of the at least two interconnectors, the anodes are formed on respective walls defined by the part of at least one solid electrolyte body and the part of at least two interconnectors and constituting the respective first gas flow channels, the cathodes are formed on respective walls defined by the part of at least one solid electrolyte body and the part of at least two interconnectors and constituting the respective second gas flow channels, each anode is opposed to an adjacent cathode or adjacent cathodes via a solid electrolyte body, and each cathode is opposed to an adjacent anode or adjacent anodes via a solid electrolyte body.

According to the electrochemical cell of the present invention, it is preferable that, as viewed in a direction orthogonal to the flow channels, each of the first gas flow channels, excluding those in extremely opposite sides of the honeycomb structural body, is adjacent to four second gas flow channels, whereas each of the second gas flow channels, excluding those in extremely opposite sides, is adjacent to the four first gas flow channels.

The process for producing the electrochemical cell according to the present invention is characterized by including the steps of forming a green molded body of the structural body by simultaneously extrusion molding a body for the at least one electrolyte body and a body for the at least two interconnectors, obtaining the structural body by firing the green molded body, and forming the anodes and cathodes on the respective walls defined by the part of at least one solid electrolyte body and the part of at least two interconnectors and constituting the respective first and second gas flow channels, respectively.

Another aspect of the process for producing the electrochemical cell according to the present invention is characterized by including the steps of forming a green molded body of the structural body by simultaneously extrusion molding a body for the at least one electrolyte body and a body for the at least two interconnectors, applying respective materials for the anodes and cathodes on the respective walls defined by the part of at least one solid electrolyte body and the part of at least two interconnectors and constituting the respective first and second gas flow channels, respectively, and firing the green molded body together with the materials applied.

The present invention is also related to an electrochemical device provided with the electrochemical cell or cells set forth above.

Having repeatedly made investigations to produce solid oxide fuel cells having a monolithic structure and a high electric power-generating efficiency, the present inventors have reached the technical idea that in order to produce such a solid oxide fuel cell, a honeycomb structural body is formed by integrating at least one dense solid electrolyte body and at least two dense interconnectors, and electrodes are formed on walls of channels extending through the honeycomb structural body.

According to the thus constructed electrochemical cell, the power-generating efficiency per unit volume is extremely high, and gas-tightness of the channels of the honeycomb structure are independently assured by the dense solid electrolyte body and the interconnectors, so that a power-generating device having a seal-less structure can be readily produced. In addition, the honeycomb-molded body to constitute at least one solid electrolyte body and at least two interconnectors can be produced by simultaneous extrusion molding. Further, since the solid electrolyte body and the interconnector are both required to be dense or gas-tight, it is easy to integrally sinter them without necessitating fine control of their porosities to fall in their respective specific ranges as in the case of the air electrode or fuel electrode.

Furthermore, since the interconnector and the solid electrolyte body are both made of their respective dense materials with high relative densities, the honeycomb structure body constituted by these dense materials has a high structural strength.

The air electrode and the fuel electrode may be formed by feeding respective materials for the air electrode and the fuel electrode into the channels of the honeycomb structural body formed above, attaching the materials upon the respective walls of the channels, and sintering the attached materials.

The present inventors applied the above structure to electrochemical cells other than the SOFC, for example, the steam electrolysis cell, and they confirmed that the efficiency per unit volume, e.g., electrolysis efficiency can be also largely enhanced, and the above mentioned function and effects can be obtained.

These and other objects, features and advantages of the present invention will be apparent from the following description of the invention when taken in conjunction with the attached drawings, with the understanding that any modifications, variations and changes may be easily made by the skilled person in the art to which the invention pertains.

BRIEF DESCRIPTION OF THE ATTACHED DRAWINGS

For a better understanding of the invention, reference is made to the attached drawings, wherein.

DETAILED DESCRIPTION OF THE INVENTION

The present invention will be explained in more detail with reference to more specific embodiments to which the present invention should not be limited.

The entire configuration of the honeycomb structural body is not particularly limited to any configuration. Further, the configuration of each channel in the honeycomb structural body is not limited to a particular one. However, from the standpoint of effectively utilizing the space, the cross-sectional shape of each channel is preferably of such a shape as an isosceles triangular shape, an equilateral triangular shape, a rectangular shape, a square shape or an equilateral hexagonal shape that the sections of the channels may fill a plane at an end side thereof. In addition, the channels may be designed such that the channels having different cross-sectional shapes such as an equilateral triangular shape and an equilateral hexagonal shape may be adjacent to each other.

The material of the interconnector is preferably a perovskite-type complex oxide containing lanthanum, more preferably lanthanum chromite, because lanthanum chromite has heat resistance, oxidation resistance and reduction resistance.

The material of the solid electrolyte body is preferably yttria-stabilized zirconia or yttria partially stabilized zirconia, but other materials may be also used. In the case of an NOx decomposition cell, cerium oxide is preferable, too.

A raw material for the anode and cathode is preferably a pervskite-type complex oxide containing lanthanum, more preferably lanthanum manganite or lanthanum cobaltite, most preferably lanthanum manganite. Lanthanum chromate and lanthanum manganite may be doped with strontium, calcium, chromium (for lanthanum manganite), cobalt, iron, nickel or aluminum. Further, the raw material may be palladium, platinum, ruthenium, a mixed powder of platinum and zirconia, a mixed powder of palladium and zirconia, a mixed powder of ruthenium and zirconia, a mixed powder of platinum and cerium oxide, a mixed powder of palladium and cerium oxide, or a mixed powder of ruthenium and cerium oxide.

The electrochemical cell according to the present invention may be used as an oxygen pump to supply oxygen.

Further, the electrochemical cell according to the present invention may be used as a high temperature steam electrolysis cell. This cell may be also used as a device for producing hydrogen, or may be used as a device for removing steam. In this case, the following reactions occur at respective electrodes.

Cathode:

Anode:

Furthermore, the electrochemical cell according to the present invention may be used as an NOx decomposing cell. This decomposing cell can be used as a purifier for exhaust gases from an automobile or an electric power-generating apparatus. Although the exhaust gases from the gasoline engines are now disposed of with three-way catalysts, such three-way catalysts are less effective in various low mileage type engines, such as lean burn engines and diesel engines. That is, since the content of oxygen in exhaust gases from those engines is large, such a three-way catalyst cannot well work with low mileage type engines.

If the electrochemical cell according to the present invention is used as an NOx decomposing cell, it can remove oxygen in exhaust gases through the solid electrolyte filmy body, and simultaneously decompose NOx into $N_2$ and $O^{2-}$ and remove the oxygen produced by this decomposition. Besides the above process, water vapor in the exhaust gases is electrolyzed into hydrogen and oxygen, and this hydrogen reduces NOx into $N_2$.

If the electrochemical cell is used as the NOx decomposing cell, the solid electrolyte filmy body is preferably made of a cerium oxide based ceramic material, whereas the cathode material is preferably made of palladium or palladium-cerium oxide cermet.

Figure 1:
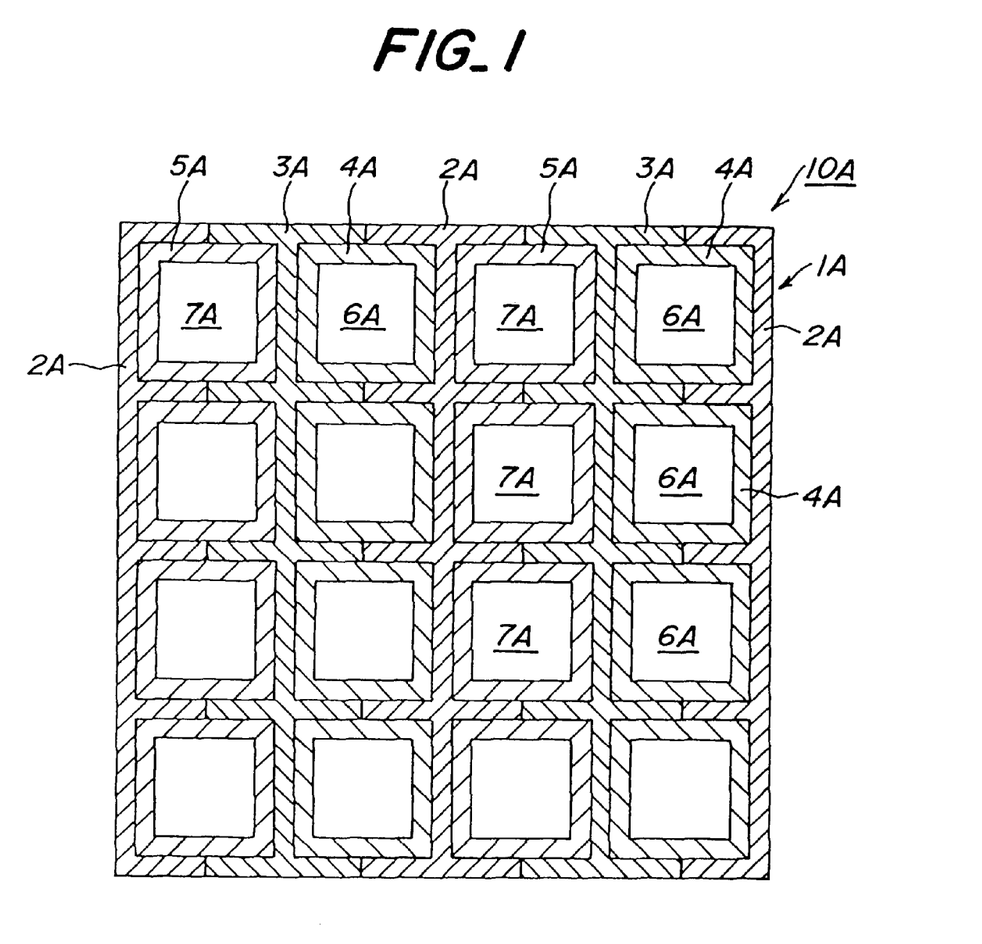
FIG. 1 is a cross-sectional view illustrating a part of an electrochemical cell 10A according to a first embodiment of the present invention.

FIGS. 1 to 4 are cross sectional views all illustrating parts of electrochemical cells as preferred embodiments according to the present invention as cut in a direction crossing channels. In the electrochemical cell 10A of FIG. 1, first gas (e.g. oxidative gas) flow channels 6A and second gas (e.g., fuel gas) flow channels 7A all having an almost square cross section are formed in a structural body 1A. A cathode 4A is formed on a surrounding wall surface of each first gas flow channel 6A, whereas an anode 5A is formed on that of each second gas flow channel 7A. In FIG. 1, both the flow channels 6A and the flow channels 7A are arranged vertically, while the gas flow channels 6A are opposed to the respectively adjacent gas flow channels 7A in a lateral direction via a solid electrolyte body 3A.

The structural body 1A also includes an interconnectors 2A and the above mentioned solid electrolyte body 3A, and each of the flow channels 6A and 7A is one-half surrounded by a part of the interconnector 2A, and in the remaining half by a part of the solid electrolyte body 3A. Consequently, each of the flow channels 6A and 7A is kept gas-tight in a cross-sectional direction thereof. In the electrochemical cell 10A of FIG. 1, two pairs of the first gas flow channel 6A rows and the second gas flow channels 7A rows are arranged in the honeycomb structural body 1A, while the first gas flow channels 6A rows and the second gas flow channel 7A rows are alternatively arranged in the lateral direction, and the interconnectors 2A are arranged at opposite sides of the structural body 1A and between the two pair of the first gas flow channel 6A rows and the second gas flow channels 7A rows.

Figure 2:
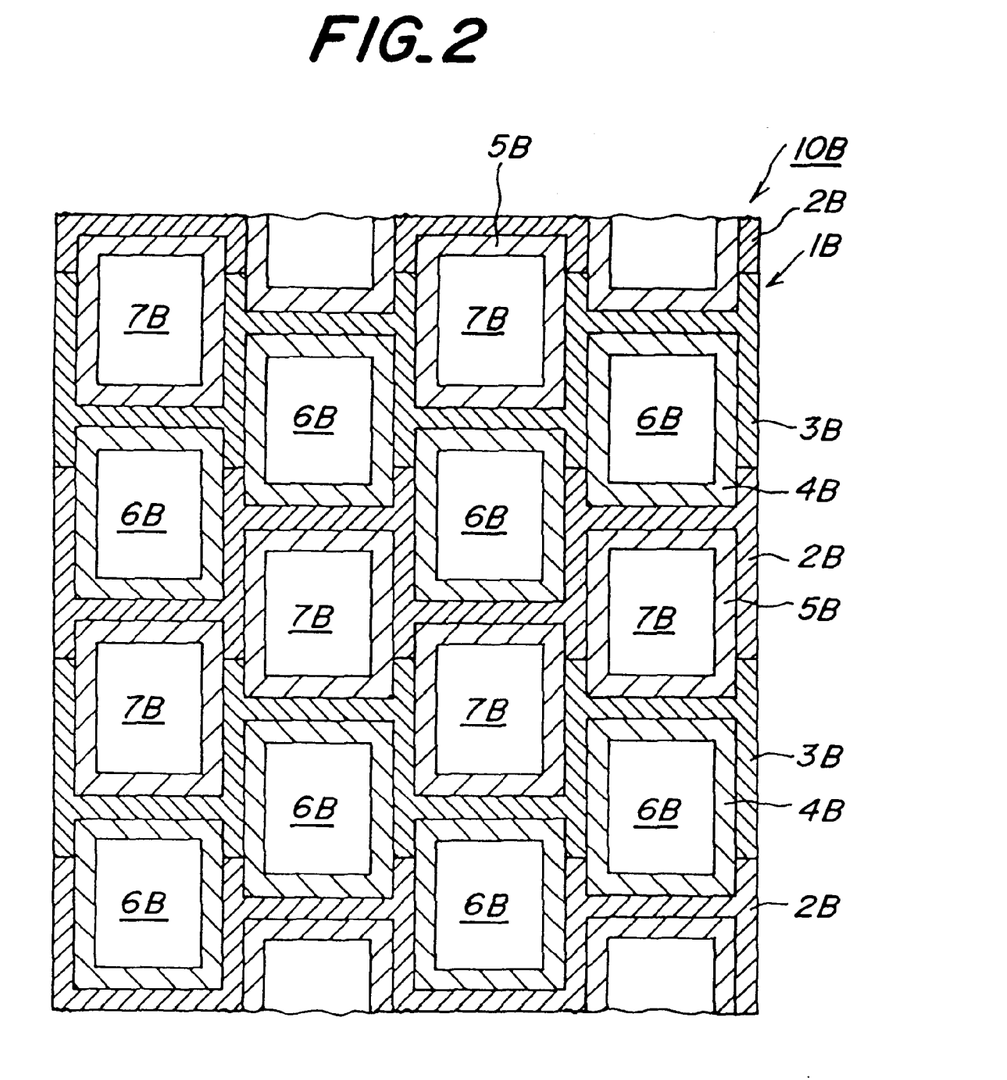
FIG. 2 is a cross-sectional view illustrating a part of an electrochemical cell 10B according to a second embodiment of the present invention.

In the electrochemical cell 10B of FIG. 2, first gas flow channels 6B and second gas flow channels 7B all having an almost square cross-sectional shape are formed in a structural body 1B. A cathode 4B is formed on a surrounding wall surface of each of the first gas flow channel 6B, and an anode 5B is formed on that of each of the second gas flow channels 7B.

The first gas flow channels 6B and the second gas flow channels 7B are arranged alternatively as viewed vertically in FIG. 2. As to the adjacent two rows, the first and second gas flow channels 6B and 7B are staggered in every other row vertically by one-half of a side of each flow channel as viewed in the lateral direction of FIG. 2. That is, one first gas flow channel 6B and one second gas flow channel 7B in one row are half-by-half opposed to one flow channel 6B in an adjacent row. Accordingly, each first flow channel 6B is adjacent to four second flow channels 7B, excluding those located at opposite sides of the structural body, whereas each second flow channel 7B is adjacent to four first flow channels, excluding those located at opposite sides of the structural body. When the configuration in FIG. 2 is adopted, the area of the electrodes can be increased, and efficiency of the electrochemical cell, for example, power-generating efficiency, electrolyzing efficiency, or oxygen-feeding efficiency can be enhanced. Further, in order to obtain a given efficiency as referred to above, the entire electrochemical device can be made compact.

The structural body 1B also includes dense interconnectors 2B and dense solid electrolyte bodies 3B, and each of the flow channels 6B and 7B is surrounded in a portion by a part of the interconnector 2B and in the remaining portion by a part of the solid electrolyte body 3B. Consequently, each of the flow channels 6B and 7B is kept gas-tight in a cross-sectional direction thereof. In the electrochemical cell 10B of FIG. 2, the first gas flow channel 6B follow zigzag lines and the second gas flow channels 7B following zigzag lines are alternatively arranged in the vertical direction, and the interconnectors 2A are arranged at opposite sides of the structural body 1A and between the two pair of the first gas flow channel 6A lines and the second gas flow channels 7A lines.

Figure 3:
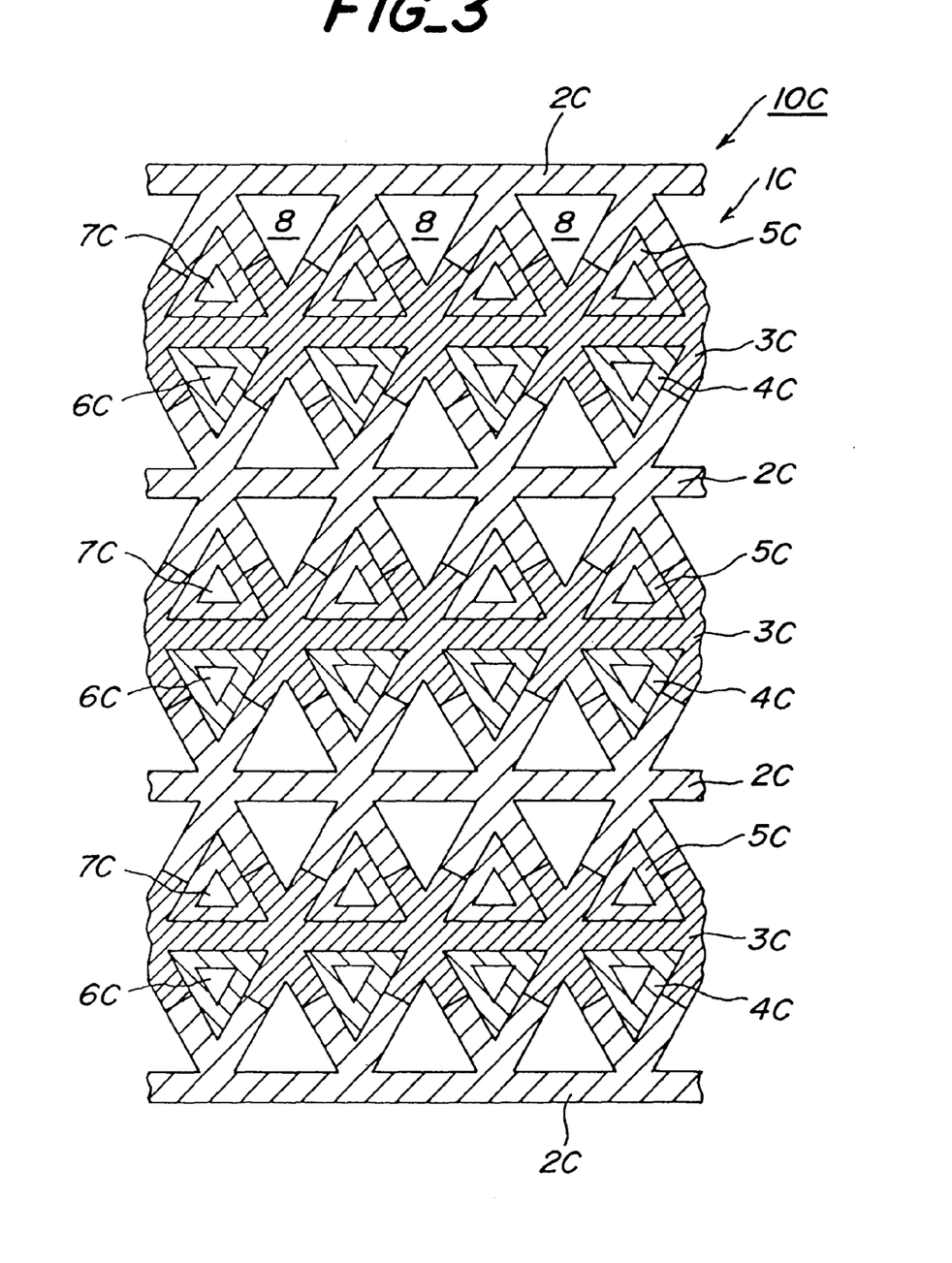
FIG. 3 is a cross-sectional view illustrating a part of an electrochemical cell 10C according to a third embodiment of the present invention.

In the electrochemical cell of FIG. 3, a structural body 10C includes dense interconnectors 2C and dense solid electrolyte bodies 3C vertically alternatively piled one upon another, and a number of channels each having a triangular cross section are formed among the interconnectors 2C and the solid electrolyte bodies 3C in the structural body 10C. A pair of a line of first gas flow channels 6C and a line of second gas flow channels 7C are opposed to each other via each of the solid electrolyte bodies 3C, and each of the first and second gas flow channels 6C and 7C is surrounded by a part of the interconnector 2C and a part of the solid electrolyte body 3C as shown in FIG. 3. As viewed vertically, the lines of the first gas flow channels 6C and the lines of the second gas flow channels are alternatively arranged. A cathode 4C is formed on a surrounding wall surface of each first gas flow channels 6C, and an anode 5C formed on that of each of the second gas flow channels 7C. Electric power is to be generated between a pair of the adjacent first and second gas flow channels 6C and 7C opposed to each other via the solid electrolyte body 3C. Between the adjacent first gas flow channels 6C in each line and between the adjacent second flow channels 7C in each line are formed channels 8 each having an almost triangular cross section. Each of the first and second gas flow channels 6C and 7C is kept by the gas-tight interconnector 2C and the gas-tight solid electrolyte body 3C as viewed in a crossing direction thereof.

Figure 4:
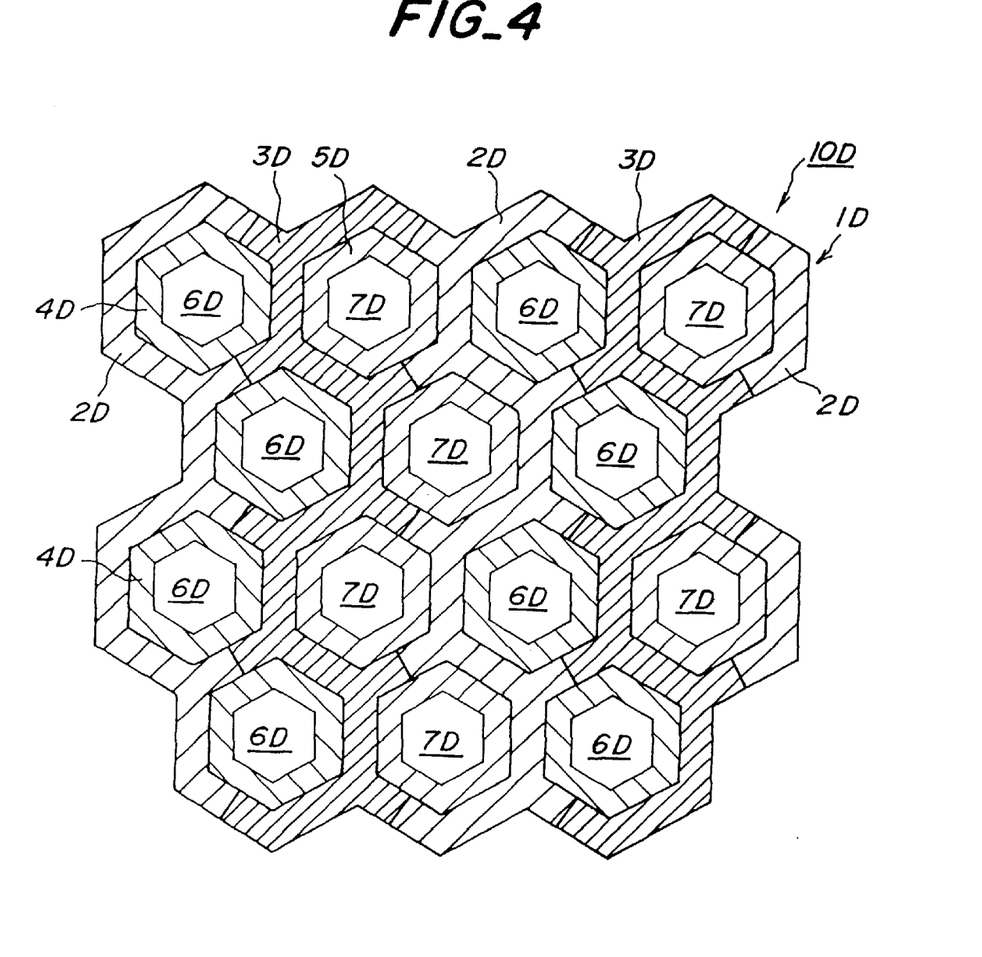
FIG. 4 is a cross-sectional view illustrating a part of an electrochemical cell 10D according to a fourth embodiment of the present invention.

In the electrochemical cell 10D of FIG. 4, a structural body 1D includes gas-tight interconnectors 2D and gas-tight solid electrolyte bodies 3D laterally alternatively piled one upon another and forming zigzag lines of first gas flow channels 6D and zigzag lines of second gas flow channels 7D in which the former zigzag lines are opposed to corresponding latter zigzag lines via the respective solid electrolyte bodies 3D as shown. The first and second gas flow channels 6D and 7D each have an almost equilateral hexagonal cross sectional shape, and are arranged in a honeycomb fashion. A cathode 4D is formed on a surrounding wall surface of each first gas flow channel 6D, and an anode 5D formed on that of each second gas flow channel 7D. Each of the first and second gas flow channels 6D and 7D is surrounded and kept gas-tight as viewed in a crossing direction thereof by a part of the gas-tight interconnector 2D and a part of the gas-tight solid electrolyte body 3D.

In the present invention, the channels in the honeycomb structural body can be easily shaped if the dimension of them in the cross section is not less than 1 mm. Further, the dimension of the channel in the cross section is preferably not more than 5 mm, because in this case, the electric resistance of the electrochemical cell unit decreases and the area of the electrodes per unit volume increases. From this point of view, the dimension of each channel is more preferably not more than 3 mm.

Figure 5:
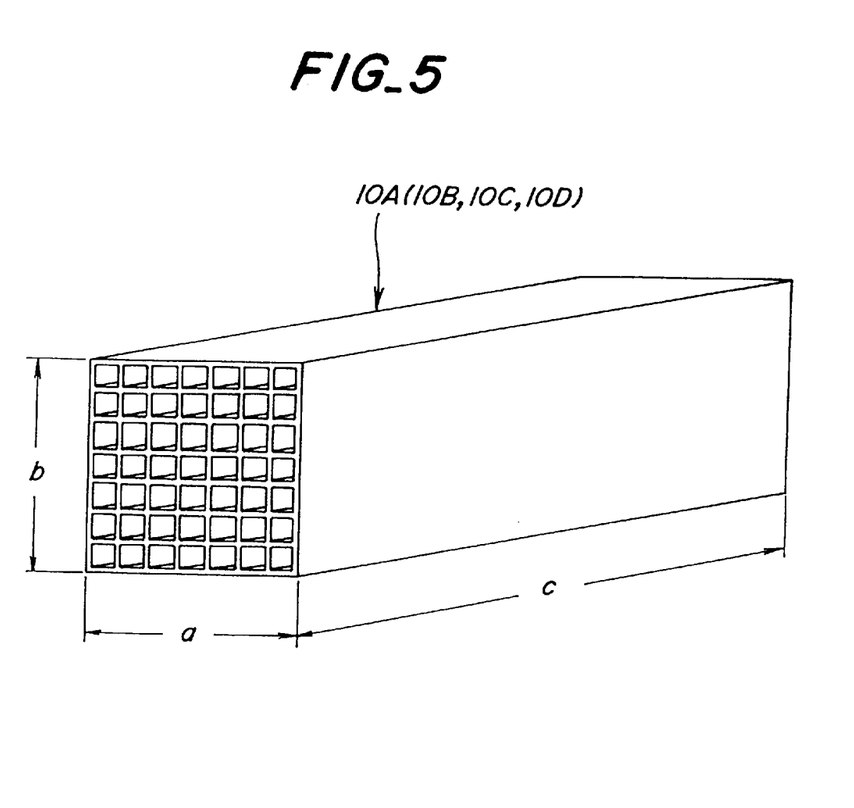
FIG. 5 is a perspective view for illustrating the outer configuration of one embodiment of the electrochemical cell according to the present invention.

The the honeycomb structural body is not limited to any particular shape. However, as viewed diagrammatically three-dimensionally in FIG. 5, a big capacity can be easily realized if the lateral and vertical dimensions "a" and "b" are not less than 5 cm, whereas excessive increase in the pressure required for the extrusion molding can be prevented if the dimensions "a" and "b" are not more than 30 cm. If the longitudinal dimension "c" is less than 10 cm, the ratio of end portions not contributing to power generation, electrolysis or oxygen feeding increases to deteriorate the efficiency of the electrochemical cell. Therefore, the longitudinal dimension "c" is preferably not less than 10 cm. If the longitudinal dimension "c" is not more than 100 cm, handling is easy at the time of extrusion molding.

The electrochemical device using the electrochemical cell according to the present invention is not limited to any particular shape. In the electrochemical cell according to the present invention, the flow channels are each surrounded by a part of the gas-tight interconnectors and a part of the gas-tight solid electrolyte body (bodies). Therefore, the electrochemical device preferably has a seal-less structure utilizing that of the electrochemical cell. Preferred embodiments of such seal-less structures are diagrammatically shown in FIGS. 6 and 7, respectively, in which interconnectors and solid electrolyte bodies are omitted. In the electrochemical device of FIG. 6, a first gas and a second gas are flown in opposite directions, respectively. In the electrochemical device of FIG. 6, the electrochemical cell 10A (10B, 10C, 10D) is placed in a can 13 of the electrochemical device such that a gas chamber 15 and a gas chamber 16 are defined at opposite sides of the can 13 as shown. An exhaust opening 17 for the first gas and an exhaust opening 18 for the second gas are formed in the can 13.

Figure 6:
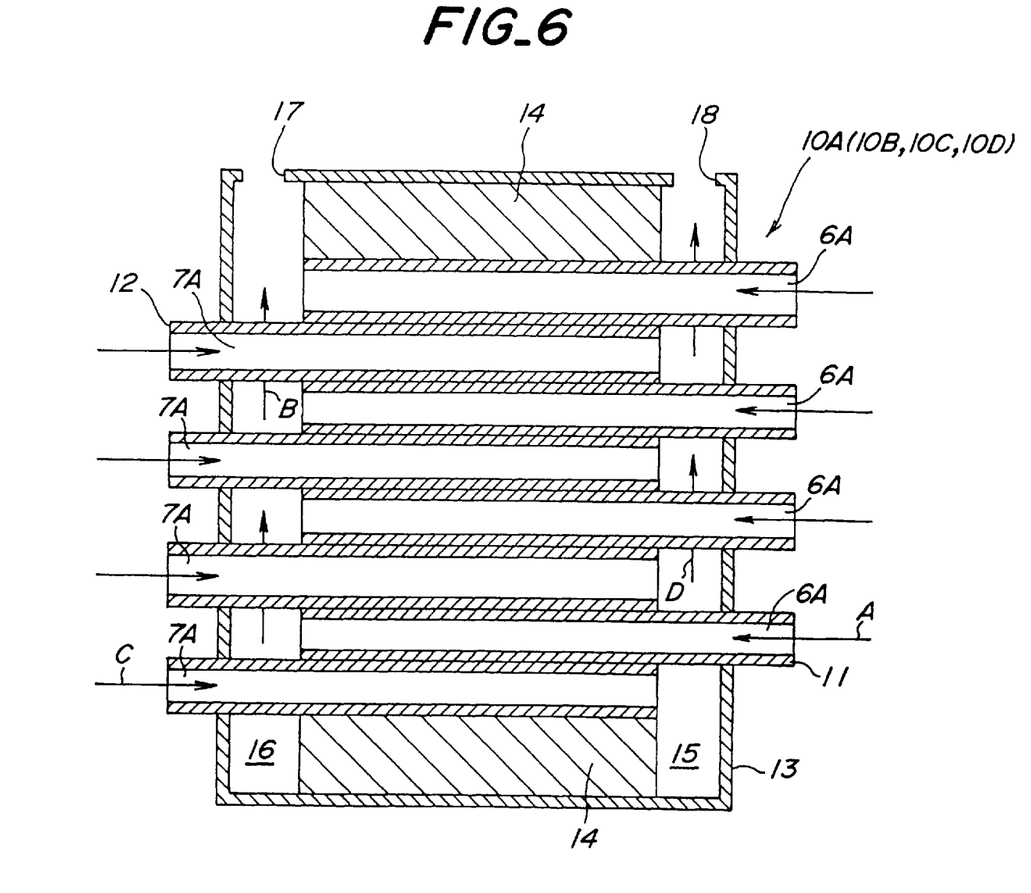
FIG. 6 is a sectional view for diagrammatically illustrating a favorable embodiment of an electrochemical device to which an electrochemical cell according to the present invention is applied.

The first gas flow channels 6A (6B, 6C, 6D) of the electrochemical cell are extended in a right direction of FIG. 6, and their extensions 11 are opened to a first gas feed mechanism (not shown) outside the can 13. On the other hand, the second gas flow channels 7A (7B, 7C, 7D) are extended in a left direction of FIG. 6, and their extensions 12 are opened to a second gas feed mechanism (not shown) outside the can 13.

The first gas is fed to the extensions 11 of the first gas flow channels 6A as shown by arrows A, flown inside the flow channels 6A and further in the gas chamber 16 as shown by arrows B, and discharged through the exhaust opening 17. On the other hand, the second gas is fed to the extensions 12 of the second gas flow channels 7A as shown by arrows C, flown inside the flow channels 7A and further in the gas chamber 15 as shown by arrows D, and discharged through the exhaust opening 18.

Figure 7:
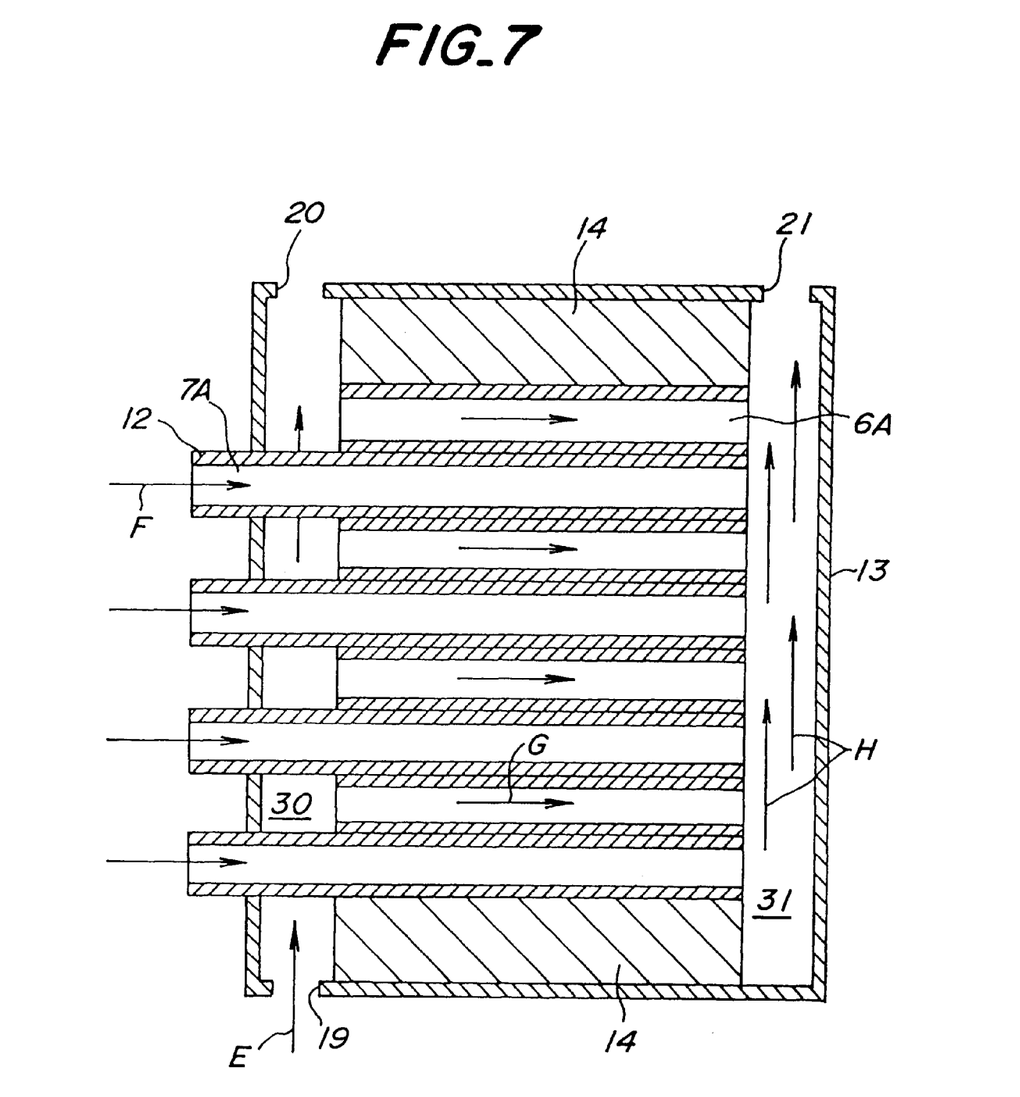
FIG. 7 is a sectional view for diagrammatically illustrating another favorable embodiment of an electrochemical device to which an electrochemical cell according to the present invention is applied.

In the electrochemical device of FIG. 7, the first gas and the second gas are flown in the same direction. The electrochemical cell 10A (10B, 10C, 10D) is placed in a can 13 such that a first gas chamber 30 and a combustion chamber 31 are defined at left and right sides of the electrochemical cell inside the can 13, respectively. A first gas feed opening 19, a first gas exhaust opening 20, and a combustion gas exhaust opening 21 are formed in the can 13 as shown.

The second gas flow channels 7A (7B, 7C, 7D) of the electrochemical cell are extended in a left direction of FIG. 7, and their extensions 12 are opened to a second gas feed mechanism outside the can 13. None of the first gas flow channels 16 are extended outwardly from the electrochemical cell.

The first gas is fed to the gas feed chamber 30 inside the can 13 through the gas feed opening 19 as shown in an arrow E. Alternatively, the first gas may be fed to the gas chamber 30 from a direction vertical to the drawing paper, for example, from a front side of the drawing paper. A part of the first gas is discharged outside through the exhaust opening 20, whereas the remainder is flown through the flow channels 6A of the electrochemical cell as shown by arrows G, and discharged to the combustion chamber 31 through downstream openings of the flow channels 6A. On the other hand, the second gas is fed to the extensions 12 of the second gas flow channels 7A as shown by arrows F, flown through the flow channels 7A and discharged into the combustion chamber 31. The combustion gas is flown as shown by arrows H, and discharged through the exhaust opening 21.

When the electrochemical device is used as an electric power-generating device (SOFC), current collectors 14 are set at upper and lower end portions, respectively, in FIGS. 6 and 7. Electric power is taken outside through these current collectors 14. A porous conductor having a buffering function, for example, a felt, is preferably set between each current collector and the SOFC, because stress is mitigated and contact electric resistance is reduced in this case. Nickel is preferred as a material for the felt and the current collectors.

A preferred embodiment of the process for producing the electrochemical cell according to the present invention will be explained with reference to a diagrammatic view of FIG. 8. In this embodiment, a body constituting a green molded body for the formation of the interconnectors and a body constituting a green molded body for the formation of the solid electrolyte bodies are continuously fed into a single die device so that the green molded bodies of the interconnectors and the solid electrolyte bodies may be extruded through the die device in a integrally joined fashion. Then, the extruded body is integrally sintered.

In a particularly preferred embodiment, the body constituting the green molded body for the formation of the interconnectors and the body constituting the green molded body of the solid electrolyte bodies are continuously fed into a single die device such that the body constituting the green molded body for the formation of the interconnectors is pushed toward the die device through a first extruding mechanism, whereas the body constituting the green molded body for the formation of the solid electrolyte bodies is pushed toward the die device through a second extruding mechanism. By so doing, the first extruding mechanism and the second extruding mechanism can be mechanically adjusted with respect to the extruding speed and the extruding pressure so that peeling or curving of the extruded body may be prevented.

The green molded body of each of the interconnector and the solid electrolyte body is preferably made by molding a mixture in which an organic binder and water are mixed into a main ingredient. As the organic binder, polyvinyl alcohol, methyl cellulose, ethyl cellulose or the like may be used. The addition amount of the organic binder is preferably 0.5 to 5 parts by weight, if the weight of the main ingredient is taken as 10 parts by weight.

Figure 8:
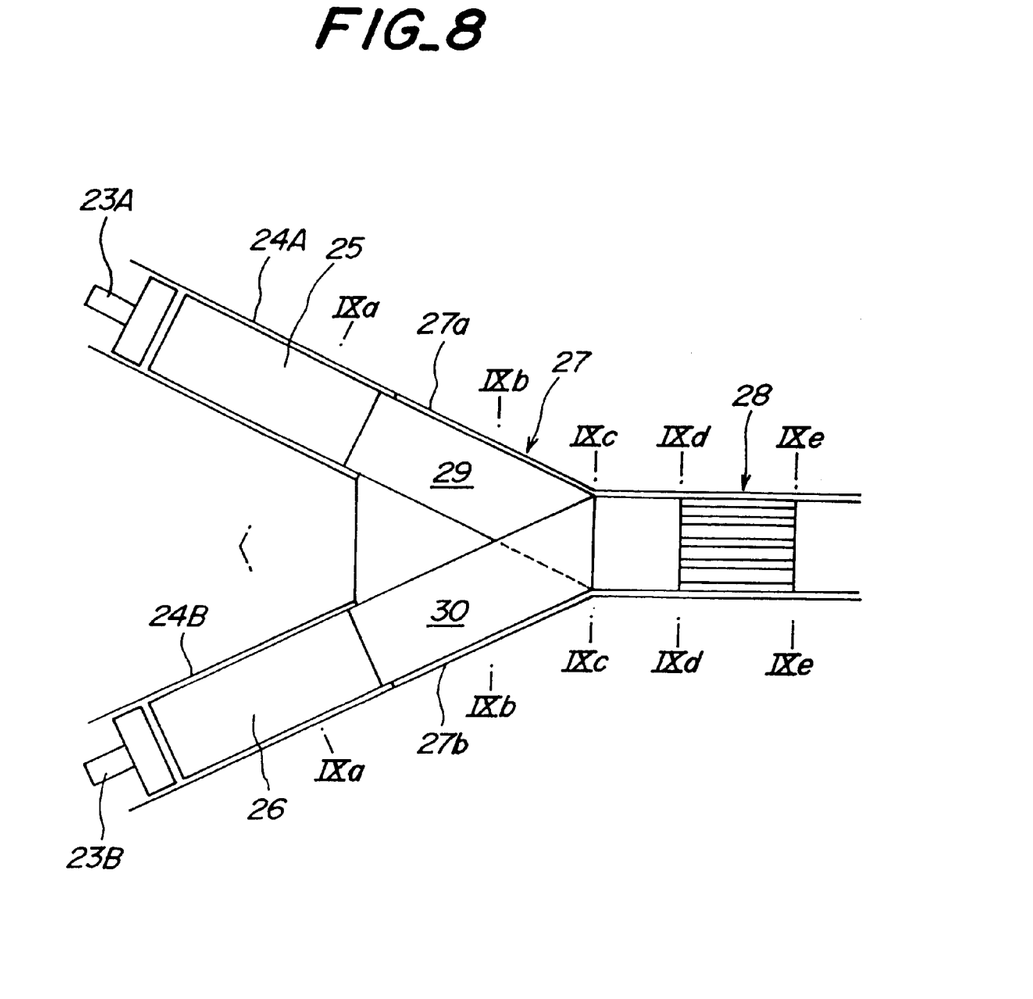
FIG. 8 is a diagrammatic view for illustrating the extrusion molding process for producing a structural body for an electrochemical cell according to the present invention.

In the embodiment of FIG. 8, a green shaped body 25 for the formation of the interconnectors and a green shaped body 26 for the formation of the solid electrolyte bodies are used. Each of the green molded bodies has, for example, a cylindrical shape. The die device 27 includes molding barrels 24A and 24B, a first die portion 27a and a second die portion 27b communicating with the molding barrels 24A and 24B, respectively, plungers 23A and 23B slidably arranged inside the molding barrels 24A and 24B, respectively, and not shown dies arranged in the die portions 27a and 27b, respectively. The green molded body 25 for the formation of the interconnectors is placed in the molding barrel 24A, and the green molded body 26 for the formation of the solid electrolyte bodies placed in the molding barrel 24B.

The body 25 is pushed into the die portion 27a by moving a shaft of the plunger 23A toward the die portion 27a, whereas the body 26 is pushed into the die portion 27b by moving a shaft of the plunger 23B toward the die portion 27b. The bodies are molded in the form of the interconnectors and the solid electrolyte bodies having the cross-sectional configuration as shown in FIGS. 1, 2, 3 or 4. A reference numeral 28 denotes a honeycomb structural body-extruding die. The thus extruded body may be fired at a firing temperature of 1400° C. to 1700° C. A reference numeral 28 is a honeycomb structural body-extruding die.

Figure 9A:
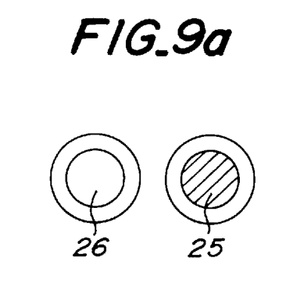
FIGS. 9(a) through 9(h) diagrammatically illustrate the embodiment in FIG. 8.
Figure 9B:
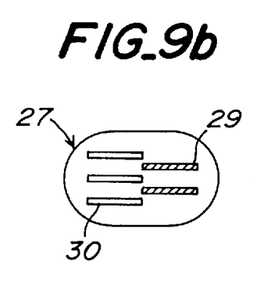
Figure 9C:
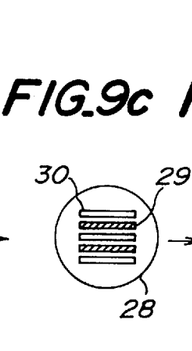
Figure 9D:
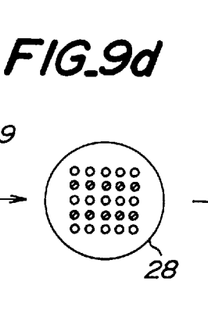
Figure 9E:
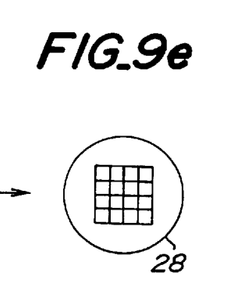
Figure 9F:
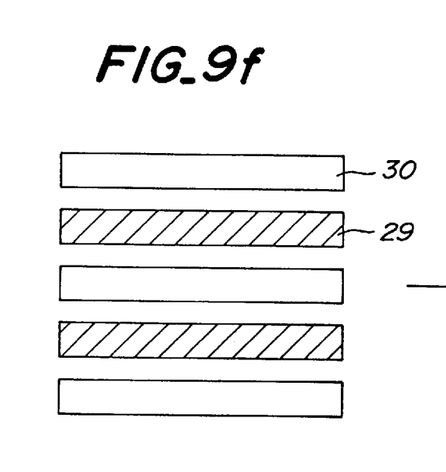
Figure 9G:
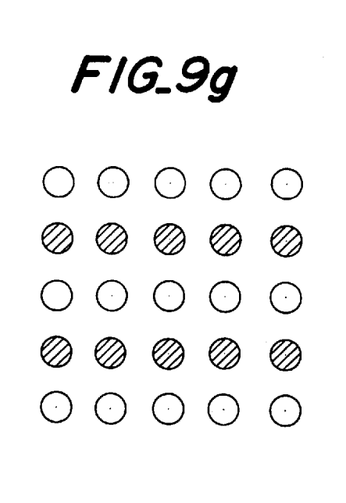
Figure 9H:
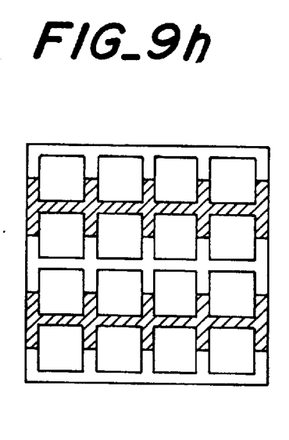

FIGS. 9(a) to 9(f) diagrammatically illustrating the embodiment shown in FIG. 8. The molding from FIG. 9(a) to FIG. 9(c) is effected by the die device 27, whereas the molding from FIG. 9(c) to FIG. 9(e) is effected by the honeycomb structural body-extruding die 28. FIGS. 9(a) to 9(e) are sectional views taken along lines IXa, IXb, IXc, IXd and IXe, respectively. Each of the green shaped bodies 25 and 26 (FIG. 9(a)) is extruded into plural planar bodies 29, 30 (FIG. 9(b)). The planar bodies 29 are inserted between the planar bodies 30 at an inlet of the honeycomb-shaped body extruding die 28 as shown in FIG. 9(c). Then, each of the planar bodies 29 and 30 arrayed as in FIG. 9(c) is divided into a row of rod-shaped bodies 29A and 30A in a matrix as shown in FIG. 9(d), and these rows of the rod-shaped bodies 29A and 30A are converted into a honeycomb structural body 31 shown in FIG. 9(e). FIG. 9(f) is an enlarged view of FIG. 9(c), FIG. 9(g) is an enlarged view of FIG. 10(d), and FIG. 9(h) an enlarged view of FIG. 9(e) through a die not shown.

Figure 10A:
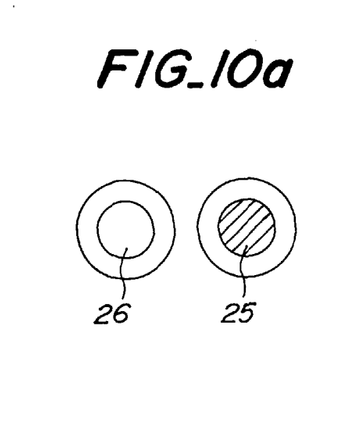
FIGS. 10(a) through 10(d) diagrammatically illustrate an embodiment similar to FIG. 9(a) through FIG. 9(h)
Figure 10B:
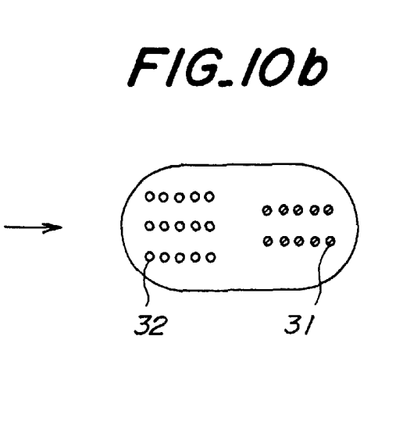
Figure 10C:
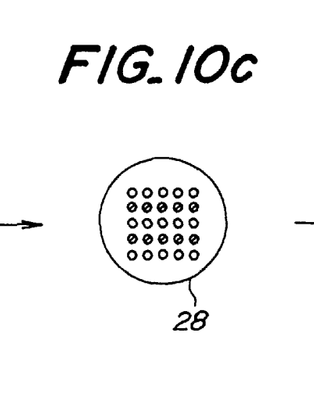
Figure 10D:
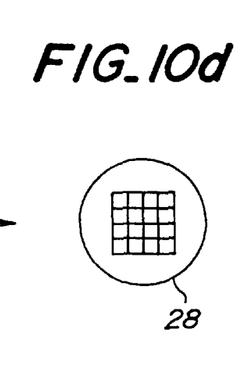
Figure 11:
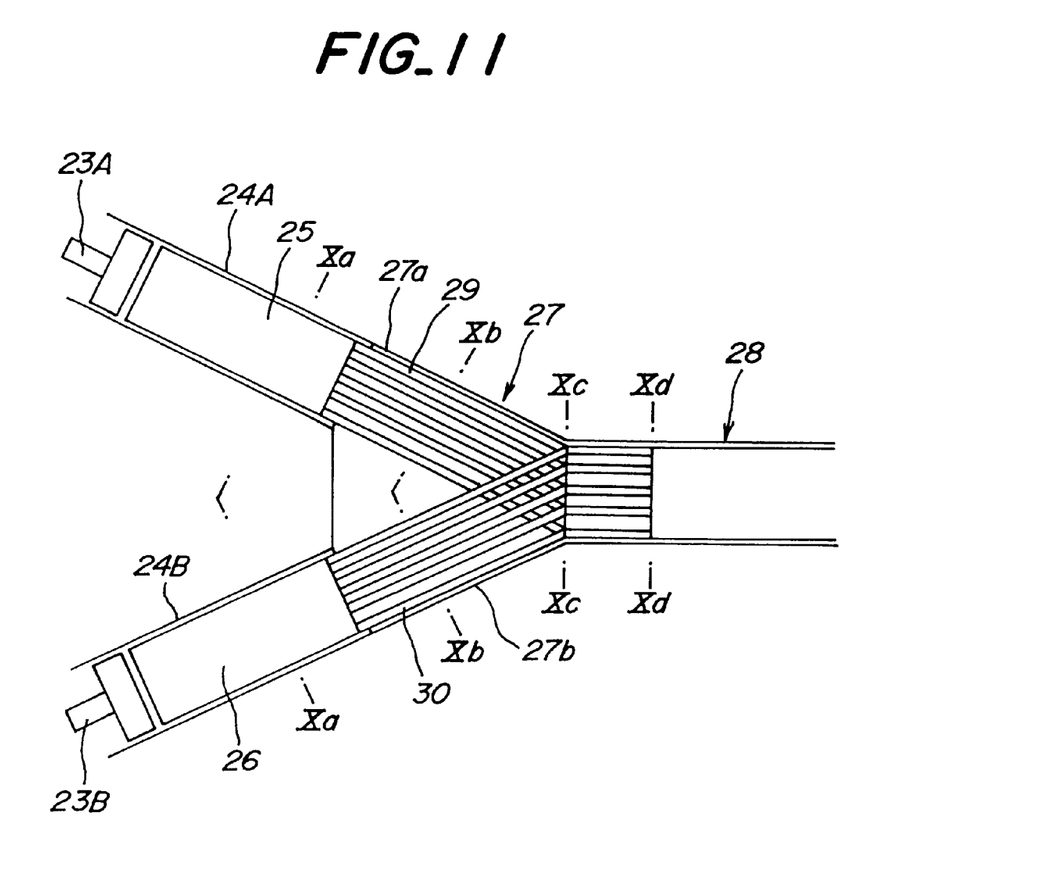
FIG. 11 diagrammatically illustrates a sectional view of the embodiment of FIG. 10(a) through FIG. 10(d).

FIGS. 10(a) to 10(f) diagrammatically illustrate another embodiment similar to that shown in FIG. 8 and FIGS. 9(a) to 9(h). FIGS. 10(a) to 10(d) are sectional views taken along lines IXa, IXb, IXc and IXd of FIG. 11, respectively. The embodiment in FIGS. 10(a) to 10(d) differs from that in FIGS. 8 and 9(a) to 9(h) in that the steps in FIGS. 9(b) and 9(c) are modified. That is, each of the green shaped bodies 25 and 26 (FIG. 9(a)) is extruded into plural rod-shaped bodies 31, 32 (FIG. 10(b)), and the rod-shaped bodies 31 are inserted between the rod-shaped bodies 32 at an inlet of the honeycomb-shaped body extruding die 28 as shown in FIG. 10(c). The thus arrayed rod-shaped bodies 31 and 32 are molded into a honeycomb structural body shown in FIG. 10(d). In the embodiment of FIGS. 10(a) to 10(f) and FIG. 11, the die device 27 may be integrally formed with the honeycomb structural body-extruding die 28.

Then, an anode material or a cathode material is applied to a surrounding wall surface of each of the channels through the thus sintered body. Although this applying method is not limited to any particular one, according to a preferred embodiment, slurries of the anode material and the cathode material are poured into the respectively intended channels, and discharged therethrough, followed by drying. Thereby, their powdery materials are attached to the respectively intended channels. Then, the resulting honeycomb structural body is entirely fired at 1100° C. to 1500° C. to form anodes and cathodes.

The present inventors actually produced steam electrolysis cells as shown in FIGS. 1 to 4. Their honeycomb structural bodies composed of the solid electrolyte bodies and the interconnectors were prepared as mentioned above. The steam electrolysis cells were produced by applying a platinum paste to this honeycomb structural body.

More specifically, a slurry having fluidity was obtained by adding polyethylene glycol into a commercially available platinum paste. This slurry was poured into every channel, thereby attaching the slurry onto the wall surfaces thereof. In this case, since the anode and the cathode may be made of the same material, it is unnecessary to pour different materials for the anodes and the cathodes into respective channels as in the case of SOFC.

Since any platinum slurry attached to a place other than the surrounding wall surfaces of the channels may cause short circuit, such a slurry must be swept off. The thus obtained honeycomb structural bodies were fired, for example, at 1000° C. for 1 hour, thereby forming platinum anodes and cathodes.

With respect to the thus produced steam electrolysis cells, argon and argon containing steam were flown on the anode side and the cathode side, respectively in the state that the cells were heated to 1000° C., while current was flown between the anodes and the cathodes. Thereby, hydrogen could be generated.

Anodes and cathodes may be formed through immersing the structural body into a slurry of a metal. For example, the structural bodies 1A, 1B, 1C and 1D as explained above were prepared. A fluidic slurry was obtained by adding polyethylene glycol into a commercially available platinum paste. Each of the structural bodies was immersed into this slurry.

At that time, the platinum slurry was attached to not only surrounding wall surfaces of the channels but also end faces of the structural body. If the structural bodies with the slurry thus attached are fired, the anodes and the cathodes may be shorted. For this reason, portions near the respective end faces of the structural body were removed by cutting. By so doing, unnecessary platinum slurry can be easily removed from the structural body without sweeping away it. The thus obtained honeycomb bodies were fired at 1000° C., thereby forming the anodes and the cathodes made of platinum.

With respect to the thus produced steam electrolysis cells, argon and argon containing steam were flown on the anode side and the cathode side, respectively, in the state that the cells were heated to 1000° C., while current was flown between the anodes and the cathodes. Thereby, hydrogen could be generated.

As having been explained above, according to the present invention, the electrochemical cells which each have a large area of the electrodes per unit voltage and high power-generating efficiency, high electrolysis efficiency, high oxygen generating efficiency or the like can be provided. Further, the electrochemical cells are structurally relatively simple, and need no special sealing mechanism and can be produced by simultaneous sintering due to their structure.

What is claimed is:

1. An electrochemical cell, comprising:

at least one solid electrolyte body, at least two interconnectors for collecting a current flowing through the cell, a plurality of anodes defining a plurality of respective first gas flow channels, a plurality of cathodes defining a plurality of respective second gas flow channels, said at least one solid electrolyte body and said at least two interconnectors forming a structural body, said first and second gas flow channels extending through the structural body in a preselected direction, each of said first and second gas flow channels comprising substantially equal first and second halves, one of said first and second halves being completely surrounded by a part of said at least one solid electrolyte body and the other of said first and second halves being completely surrounded by a part of one of said at least two interconnectors, said anodes being formed on said part of said at least one solid electrolyte body and said part of said one of said at least two interconnectors, and said cathodes being formed on said part of at least one solid electrolyte body and said part of said one of said at least two interconnectors, wherein said anodes and cathodes are separated from adjacent anodes or cathodes by a solid electrolyte body.

2. The electrochemical cell set forth in claim 1, wherein as viewed in a direction orthogonal to the flow channels, every first gas flow channel excluding those in extremely opposite sides of the structural body is adjacent to four second gas flow channels, whereas every second gas flow channels excluding those in said extremely opposite sides is adjacent to four first gas flow channels.

3. The electrochemical cell set forth in claim 1, wherein a cross sectional view of each of the first and second gas flow channels is one selected from the group consisting of an isosceles triangular shape, an equilateral triangular shape, a rectangular shape, a square shape and an equilateral hexagonal shape.

4. In an electrochemical device including an electrochemical cell, the electrochemical cell comprising:

at least one solid electrolyte body, at least two interconnectors for collecting a current flowing through the cell, a plurality of anodes defining a plurality of respective first gas flow channels, a plurality of cathodes defining a plurality of respective second gas flow channels, said at least one solid electrolyte body and said at least two interconnectors forming a structural body, said first and second gas flow channels extending through the structural body in a preselected direction, each of said first and second flow channels comprising substantially equal first and second halves, one of said first and second halves being completely surrounded by a part of said at least one solid electrolyte body and the other of said first and second halves being completely surrounded by a part of one of said at least two interconnectors, said anodes being formed on said part of said at least one solid electrolyte body and said part of said one of said at least two interconnectors, said cathodes being formed on said part of at least one solid electrolyte body and said part of said one of said at least two interconnectors, and wherein said anodes and cathodes are separated from adjacent anodes or cathodes by a solid electrolyte body.

5. An electrochemical cell, comprising:

at least one solid electrolyte body, at least two interconnectors for collecting a current flowing through the cell, a plurality of anodes defining a plurality of respective first gas flow channels, a plurality of cathodes defining a plurality of respective second gas flow channels, said at least one solid electrolyte body and said at least two interconnectors forming a structural body, said first and second gas flow channels extending through the structural body in a preselected direction, each of said first and second gas flow channels comprising first and second sections each including a plurality of sidewalls, the sidewalls of one of said first and second sections being completely surrounded by a part of said at least one solid electrolyte body and the sidewalls of the other of said first and second sections being completely surrounded by a part of one of said at least two interconnectors, said anodes being formed on said part of said at least one electrolyte body and said part of said one of said at least two interconnectors, said cathodes being formed on said part of at least one solid electrolyte body and said part of said one of said at least two interconnectors, and wherein said anodes and cathodes are separated from adjacent anodes or cathodes by a solid electrolyte body.

6. The electrochemical cell set forth in claim 5, wherein as viewed in a direction orthogonal to the flow channels, every first gas flow channel excluding those in extremely opposite sides of the structural body is adjacent four second gas flow channels, and wherein every second gas flow channel excluding those in said extremely opposite sides is adjacent four first gas flow channels.

7. The electrochemical cell set forth in claim 5, wherein a cross sectional view of each of the first and second gas flow channels is one selected from the group consisting of an isosceles triangular shape, an equilateral triangular shape, a rectangular shape, a square shape and an equilateral hexagonal shape.

8. In an electrochemical device including an electrochemical cell, the electrochemical cell comprising:

at least one solid electrolyte body, at least two interconnectors for collecting a current flowing through the cell, a plurality of anodes defining a plurality of respective first gas flow channels, a plurality of cathodes defining a plurality of respective second gas flow channels, said at least one solid electrolyte body and said at least two interconnectors forming a structural body, said first and second gas flow channels extending through the structural body in a preselected direction, each of said first and second gas flow channels comprising first and second sections each including a plurality of sidewalls, the sidewalls of one of said first and second sections being completely surrounded by a part of said at least one solid electrolyte body and the sidewalls of the other of said first and second sections being completely surrounded by a part of one of said at least two interconnectors, said anodes being formed on said part of said at least one solid electrolyte body and said part of said one of said at least two interconnectors, said cathodes being formed on said part of at least one solid electrolyte body and said part of said one of said at least two interconnectors, and wherein said anodes and cathodes are separated from adjacent anodes or cathodes by a solid electrolyte body.

* * * * *